(12) United States Patent
Rust et al.

(10) Patent No.: US 7,448,044 B1
(45) Date of Patent: Nov. 4, 2008

(54) SYSTEMS AND METHODS FOR EFFICIENT QUEUE PAIR NUMBER RE-USE

(75) Inventors: Stephen T. Rust, Newton, MA (US); Stephen A. Jay, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 426 days.

(21) Appl. No.: 11/050,138

(22) Filed: Feb. 2, 2005

(51) Int. Cl.
*G06F 13/00* (2006.01)

(52) U.S. Cl. .................. 719/314; 709/203; 709/217; 709/223; 709/231

(58) Field of Classification Search ................ 719/314; 709/203, 217, 223, 231
See application file for complete search history.

(56) References Cited

U.S. PATENT DOCUMENTS 7,133,943 B2 * 11/2006 Carnevale et al. ............ 710/52

2004/0156376 A1 * 8/2004 Nakagawa .................. 370/412

* cited by examiner

*Primary Examiner*—Andy Ho
(74) *Attorney, Agent, or Firm*—Brooks Kushman P.C.

(57) ABSTRACT

Systems and methods are described for providing queue pair numbers for a queue pair to more effectively track and manage the frequency of use and re-use of queue pair numbers on a queue pair context basis in an InfiniBand™ device. The present invention uses a counter for each queue pair context to set the changeable portion of the queue pair number. A reference count for each queue pair context is also used to track the quantity of queue pair numbers currently allocated to a queue pair context. The present invention sets, tracks and manages the values of the counter and the reference count for each queue pair context in conjunction with queue pair operations to provide a systematic queue pair numbering scheme. By tracking and/or setting values of the counter and reference count for a queue pair context, the present invention re-uses queue pair numbers efficiently and in a predictable and repeatable manner.

20 Claims, 7 Drawing Sheets

Fig. 3A (310)

| Operation | Reference Count | Counter |
|---|---|---|
| QP-Alloc | 1 | 1 |
| QP-Free (not QPN) | 1 | 1 |
| Release-QPN | 0 | 1 |

Fig. 3B (315)

| Operation | Reference Count | Counter |
|---|---|---|
| QP-Alloc | 1 | 1 |
| QP-Free (release) | 0 | 1 |

Fig. 3C (320)

| Operation | Reference Count | Counter |
|---|---|---|
| QP-Alloc | 1 | 1 |
| QP-Free (not QPN) | 1 | 1 |
| QP-Alloc repeated 12x | 13 | 13 |
| Release-QPN | 12 | 13 |
| Release-QPN repeated 11x | 1 | 13 |
| Release-QPN | 0 | 13 |

Fig. 3D (325)

| Operation | Reference Count | Counter |
|---|---|---|
| QP-Alloc | 1 | 1 |
| QP-Free (not QPN) | 1 | 1 |
| Repeat QP-Alloc + QP-Free (not QPN) 127x | 128 | 128 |
| Release-QPN | 127 | 128 |
| Repeat Release-QPN 127x | 0 | 0 |

SYSTEMS AND METHODS FOR EFFICIENT QUEUE PAIR NUMBER RE-USE

TECHNICAL FIELD

The present invention generally relates to a queue pair numbering scheme for efficiently re-using queue pair numbers.

BACKGROUND INFORMATION

In an InfiniBand™ Architecture network system, channel adapters are devices that generate and consume packets sent and received over a port connected to the InfiniBand™ fabric. A channel adapter port implements queue pairs to provide a virtual interface and communication port for sending and receiving packets. A queue pair has a send queue for sending packets and a receive queue for receiving packets. Communication takes place between a queue pair of a source port and a queue pair of a destination port of respective channel adapters.

Each queue pair is assigned a number referred to as a queue pair number. As each port may use multiple queue pairs, the queue pair number is used for identifying the queue pair in communications between channel adapters. The InfiniBand™ Architecture specification indicates using a twenty-four (24) bit number for the queue pair number. Although not described by the InfiniBand™ Architecture specification, some implementations of the channel adapter may use the queue pair number to also identify other information. For example, a portion of the queue pair number may identify a queue pair context, which is context information related to use of the queue pair. Each queue pair allocated as a communication resource has a queue pair context. Typically, the queue pair context may be stored in a hardware table.

In some channel adapter implementations, one portion of the queue pair number, such as a set of least significant bits, may provide a pointer to the queue pair context. The pointer may be an index into the hardware table storing the queue pair context information. This portion of the queue number is fixed by the value of the index to the queue pair context. Another portion of the queue pair number, such as a set of the most significant bits, may be changeable to form a set of different combinations of queue pair numbers associated with a specific queue pair context. That is, the most significant bits of the queue pair number can be combined with the fixed portion of the index to the queue pair context to provide different queue pair number values for a specific queue pair context. Therefore, the possible combinations of queue pair numbers for a queue pair context is limited to the combination of values that can be generated by the changeable portion of the queue pair number, or the number of bits that can be changed.

Typically, the changeable portions of queue pair numbers are generated from a global counter applicable to all queue pair contexts. The global counter is used to set the most significant bits of the queue pair number assigned to an allocated queue pair. For each allocation of a queue pair number to any queue pair context, the global counter is incremented to represent the next value to be assigned to a queue pair. Using a global counter for all queue pair contexts provides an approach that is adequate under some circumstances. However, this approach also causes problems under other circumstances.

Many queue pairs and queue pair numbers can be allocated and freed in the course of communications in the InfiniBand™ fabric. With the quantity of queue pair numbers and queue pair contexts available for use limited by the channel adapter hardware implementation, queue pair contexts will be re-used. Also, queue pair numbers referencing the queue pair contexts will be re-used. Since the global counter is applicable to all queue pair contexts, the queue pair number provided to a queue pair of a particular queue pair context is random based on the various multitude of queue pair allocations that have occurred and the current value of the global counter. With the randomness of queue pair numbers for a particular queue pair context provided by the global counter, not all the possible combinations of queue pair numbers for a queue pair context may be used. Additionally, certain queue pair numbers may be re-used more of less frequently than others.

Without tracking the use of queue pair numbers, such as using the global counter approach, a queue pair number may be re-used before it should. This causes errors in the communication interfaces of a destination port or source port, such as invalid states and invalid or no responses. For example, a source channel adapter may reference a queue pair number in a destination port that has different information in the queue pair context because the destination port has re-used the queue pair number. The source channel adapter may have not yet released the queue pair number from its previous use. As such, the source channel adapter has a queue pair number that exists in the destination channel adapter but has since changed the information in the queue pair context because it is used for a different communication connection or context.

SUMMARY OF THE INVENTION

The present invention provides systems and methods for determining queue pair numbers for a queue pair associated with a queue pair context to more effectively track and manage the frequency of use and re-use of queue pair numbers. The present invention uses a counter for each queue pair context to set the changeable portion of the queue pair number not identifying the queue pair context. A reference count for each queue pair context is also used to track the quantity of queue pair numbers outstanding that are currently associated with a queue pair context. The present invention sets, tracks and manages the values of the counter and the reference count for each queue pair context to provide a systematic queue pair numbering scheme. The counter and reference count are managed in conjunction with queue pair operations. As queue pair and queue pair number operations are performed, the present invention tracks and/or sets values of the counter and reference count for a queue pair context to re-use queue pair numbers efficiently and in a predictable and repeatable manner.

In one aspect, the present invention relates to a method for providing an identifier for a queue pair associated with a context. The method comprises the step of providing an identifier for a queue pair associated with a context. The identifier includes a number having a first portion and a second portion. The second portion of the number may identify the context. The method sets the first portion of the number to a value of a counter. The counter has the value to be used for setting the first portion of the number for each identifier associated with the context. The method also includes setting a value of a reference count as an indicator of whether one or more identifiers are associated with the context.

In another aspect, the method of the present invention increments the reference count and the counter for each identifier associated with the context. Additionally, the method may set the counter to an initial value if the reference count indicates that an identifier is not associated with the context, and may set the counter to the initial value only if the counter reaches a maximum value. The method further decrements the reference count for each identifier released from association with the context.

In a further aspect, the method of the present invention may only provide the identifier if the counter is less than a maximum value. The method re-uses the identifier for a second entity associated with the context if the counter has reached a maximum value and the reference count indicates that an identifier is not associated with the context.

In another aspect, the method of the present invention is practiced with an embodiment wherein the queue pair is in a communication interface of a network device, such as in a channel adapter of an InfiniBand™ device, in an InfiniBand switch, or in a blade server switch. Additionally, the context may include a queue pair context. As such, the second portion of the number may provide an index into a portion of the communication interface storing information associated with the queue pair.

In one aspect, the present invention relates to a device readable medium having device readable instructions to execute the steps of the method, as described above, related to providing an identifier for a queue pair associated with a context.

In another aspect, the present invention is related to a network device having a mechanism providing an identifier of a queue pair associated with a context. The network device includes a queue pair used by the network device, and a context having information associated with the queue pair. The network device further includes a mechanism for assigning an identifier to the queue pair associated with the context. The identifier includes a number having a first portion and a second portion. The second portion may be used to identify the context. The network device also includes a counter to represent for the context the value to be assigned to the first portion of the number of the identifier, and a reference count to indicate whether one or more identifiers are associated with the context. In operation, the mechanism specifies the first portion of the number of the identifier to comprise the value of the counter, and sets a value to the reference count to indicate one or more identifiers are allocated to the context.

In one aspect of the present invention, the mechanism of the network device assigns the identifier to the queue pair if the counter is less than a maximum value. Additionally, the mechanism increments the reference count and the counter for each identifier associated with the context. The mechanism decrements the reference count for each identifier released from association with the context. In one case, the mechanism sets the counter to a starting value if the reference count indicates that one or more identifiers are not associated with the context. In another case, the mechanism sets the counter to a starting value if the counter reaches a maximum value, and the reference count indicates that one or more identifiers are not associated with the context The network device of the present invention assigns the identifier to a second queue pair associated with the context if the counter reaches a maximum value and the reference count indicates that an identifier is not associated with the context. The queue pair used by the network device may be included in a communication interface, such as a queue pair in a channel adapter of an InfiniBand™ device. The context may include a communication resource context, such as a queue pair context. Additionally, the second portion of the number may provide an index into a portion of the communication interface storing information associated with the queue pair.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 3A-3D are tables illustrating examples of a queue pair numbering scheme as practiced in conjunction with the illustrative method of FIGS. 2A-2C.

DETAILED DESCRIPTION

Figure 1A:
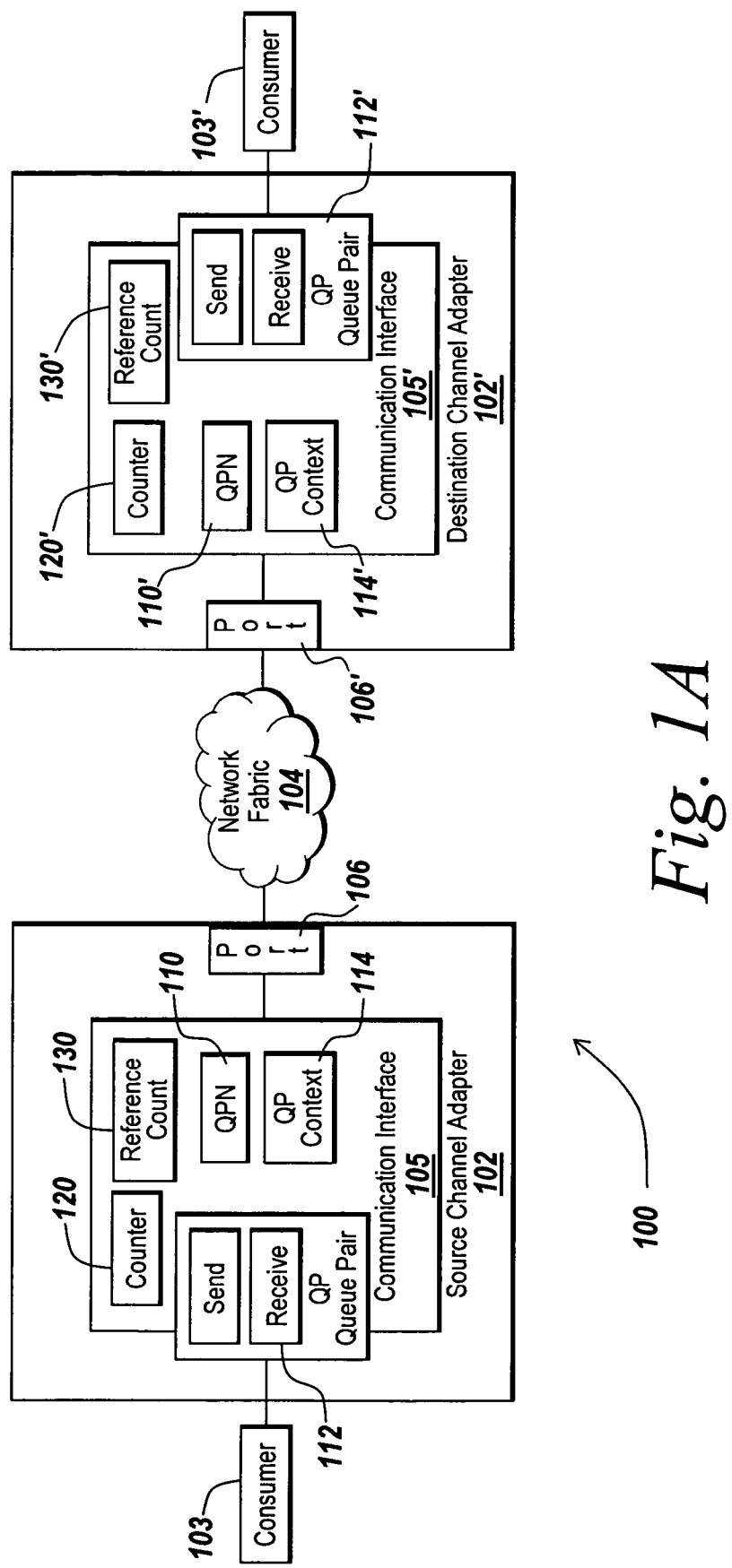
FIG. 1A is a block diagram of an environment for practicing an illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for determining queue pair numbers for a queue pair associated with a queue pair context to more effectively track and manage the frequency of use and re-use of queue pair numbers. The present invention uses a counter for each queue pair context to set the changeable portion of the queue pair number. The counter represents the next value to be assigned to the changeable portion of the queue pair number for a queue pair context. A reference count for each queue pair context is also used to track the quantity of queue pair numbers currently allocated to a queue pair context. The illustrative embodiment of the present invention sets, tracks and manages the values of the counter and the reference count for each queue pair context to provide a systematic queue pair numbering scheme. The counter and reference count are managed in conjunction with queue pair operations. As queue pair and queue pair number operations are performed, such as queue pair allocation, queue pair free, or queue pair number release operations, the present invention tracks and/or sets values of the counter and reference count for a queue pair context.

The systematic queue pair numbering scheme of the present invention ensures queue pair numbers will not be re-used until it is appropriate or desired to do so. In one embodiment, a queue pair number is not re-used until a desired quantity or all of the possible queue pair numbers for a specific queue pair context has been used. This provides an approach to use all or more of the combinations of available queue pair numbers and reduces the frequency of reusing a queue pair number. By tracking and managing the states of queue pair numbers for queue pair contexts, the present invention will prevent and/or reduce communication interfacing problems due to inappropriate queue pair numbers. Furthermore, the present invention provides a reliable and repeatable queue pair numbering mechanism that can be relied on by communication interfaces using the queue pairs.

The illustrative embodiment will be described solely for illustrative purposes relative to queue pairs and queue pair numbers in a channel adapter, or any other network device or element implementing any version of the InfiniBand™ Architecture specification, or otherwise associated with an InfiniBand™ fabric. Although the illustrative embodiment will be described relative to the InfiniBand™ Architecture, one of ordinary skill in the art will appreciate that the present invention may be applied to other environments, such as other network related architectures and communication resources, and any numbers or identifiers associated therewith. Moreover, one ordinarily skilled in the art will appreciate that the present invention may be applied to any numbering or naming scheme to assign and re-use identifiers to any type of entity, item, object or resource.

FIG. 1A depicts an environment suitable for practicing an illustrative embodiment of the present invention. The system 100 of FIG. 1A illustrates a portion of the communication stack in an example of a channel adapter in an InfiniBand™ Architecture (also referred herein as "IBA") system. In brief overview, a source channel adapter 102 is in communication over the network fabric 104, or network, to a destination channel adapter 102'. In some embodiments, channel adapters 102, 102' are IBA devices in processors and I/O units for sending and receiving packets. In one embodiment, a channel adapter 102, 102' is a programmable direct memory access (DMA) engine allowing local and remote operations. Although the illustrated example describes a channel adapter 102, 102' any element may be used to perform the operations of the present invention as described herein. The channel adapters 102, 102' may be located in any network device, any processing device connected to the network 104, or any other type of device performing input and output operations.

Each channel adapter 102, 102' comprises a communication interface 105, 105' and a port 106, 106'. The channel adapter 102 may have one or more ports 106 connected by any suitable network connection and/or transmission medium to the network fabric 104. Each port 106, 106' of a channel adapter 102, 102' has a communication interface 105, 105' comprising a queue pair 112, 112' (also referred herein as "QP") having send and receive buffers so that each port 106, 106' is capable of sending and receiving packets. Queue pairs 110, 110' provide communication resources for the communication interface 105, 105' for each port 106, 106'. Communication takes place between a queue pair 112 of a source port 106 and a queue pair 112' of a destination port 106'.

As one ordinarily skilled in the art will recognize, a queue pair 112, 112' in the IBA provides the virtual interface and communication port for the consumer 103, 103' using the channel adapter 102, 102'. The term consumer 103, 103', as used in the IBA specification, refers to a user of the functionality provided by the channel adapter 102, 102'. The channel adapter 102, 102' may provide access to the functionality via an interface, such as a programming interface provided by an operating system. As a virtual interface and communication port, the queue pair 122, 112' provides a logical implementation of using the communication functionality of the channel adapter 102, 102' for exchanging communications via the physical port 106, 106' with another channel adapter 102, 102' on the network fabric 104. The IBA supports a multitude of queue pairs 110, 110' per channel adapter 102, 102' and each queue pair operates independently from other queue pairs 110, 110'. One ordinarily skilled in the art will also appreciate that the communication interface 105, 105' handles any of the communicating and interfacing logic and management suitable for a consumer 103, 103' to communicate on the network 104 via the channel adapter 102, 102' via a port 106, 106'. For example, the communication interface 105, 105' or a portion thereof may be implemented as a device driver and/or communication driver. In an exemplary embodiment, the communication interface 105, 105' comprises the tavor driver, an InfiniHost InfiniBand (IB) driver manufactured by Sun Microsystems, Inc. of Santa Clara, Calif. In other embodiments, the communication interface 105, 105' may be implemented in other drivers and software manufactured by Sun Microsystems, Inc.

For each queue pair 112, 112', a queue pair number 110, 112' provided in accordance with the present invention can be allocated, assigned or otherwise associated with the queue pair 112, 112'. In one embodiment, the virtual communication port provided by a queue pair 112, 112' is created and a queue pair number 110, 110' of the present invention is allocated to the queue pair by performing a QP allocation operation. The queue pair number 110, 110' identifies the queue pair 112, 111 in order to support communications between the queue pair 112 of a source port 106 and a queue pair 112' of a destination port 106'. In the IBA, unique addresses, referred to as local identifiers, are used to identify end nodes in a subnet of the network 104, and for directing packets within the network 104. As such, the source port 106 is assigned a source local identifier and the destination port 106', a destination local identifier.

The communication interface 105 of the source channel adapter 102 can identify the consumer 103' of the destination channel adapter 112' by the port 106', queue pair number 110', and destination local identifier. Likewise, the communication interface 105' of the destination channel adapter 102' can identify the consumer 103 of the source channel adapter 102 by the respective port 106, queue pair number 110, and source local identifier. A queue pair 112, 112' may be associated with exactly one consumer 103, 103', such as in a connection oriented service in an IBA implementation. Each port 106, 106' may also each have multiple queue pairs 110, 110'. As such, the port 106, 106' and queue pair number 110, 110' along with the local identifiers are used to uniquely identify a connection of the consumer 103, 103'.

As part of the communication interface 105, 105', a queue pair context 114, 114' may be associated with each queue pair 112, 112'. In the illustrated example of an IBA based system 100 of FIG. 1A, a queue pair context 114, 114' comprises information related to the queue pair 112, 112', such as information related to a connection of the queue pair 112, 112', state and/or attributes of the queue pair 112, 112' or any resources used by the queue pair 112, 112'. For example, the queue pair context 114, 114' may include information such as the identifier or ID of the target destination channel adapter 102', a service level associated with the type of service of the queue pair 112, 112', and any operating limits negotiated during the establishment of communication between a source queue pair 112 and a destination queue pair 112'. The queue pair context 114, 114' may be stored in a hardware table of a channel adapter 102, 102', the communication interface 105, 105', or by any suitable mechanism or means known by those ordinarily skilled in the art.

In order to provide the queue pair number 110, 112' for the queue pair 112, 112' in accordance with the present invention, the communication interface 105, 105' comprises a counter 120, 120' and a reference count 130, 130' for each queue pair context 114, 114'. In an exemplary embodiment, the counter 120 stores, indicates, references or otherwise provides the next value to be used to form a queue pair number 110, 112'. The value of the counter 120 may be any type of numerical representation. In other embodiments, any type of suitable value may be used. The reference count 130 provides an indicator whether one or more queue pair numbers 112, 112' are currently allocated or otherwise outstanding for a queue pair context 114, 114'. In one embodiment, the reference count 130 may provide any form of numerical representation to indicate the number of queue pair numbers 112, 112' that may be outstanding, allocated or otherwise considered in use or unavailable for re-use. In other embodiments, the reference count 130 may be a string, text, Boolean, or other type of value indicating that at least one, or that one more queue pair numbers 112, 112' are outstanding. The use of the counter 120 and reference count 130 will be described in detail below in conjunction with an illustrative method of the present invention.

Although shown in FIG. 1A as part of the communication interface 105, 105', the counter 120 and reference count 130 may be implemented in any software and/or hardware element of the channel adapter 102, 102' or accessible by the channel adapter 102, 102'. In one embodiment, the counter 120 and/or reference count 130 may be implemented in executable instructions of and/or memory used by the communication interface 105, 105', such as the tavor driver of Sun Microsystems, Inc., or any other driver or software manufactured by Sun Microsystems, Inc. In another embodiment, the counter 120 and/or reference count 130 may be implemented in the logic of any integrated circuit or any hardware element. In a further embodiment, the counter 120 and/or reference count 130 may be accessible by the communication interface 105, 105' either from an element of the channel adapter 102, 102' or the processing node or I/O unit that may host the channel adapter 102, 102'. In a further embodiment, the counter 120 and/or reference count 130 may be implemented in a hardware table in a similar manner as an embodiment of the queue pair context 114, 114'.

Although generally described as a queue pair 112, 112' associated with a channel adapter 102, 102' in the illustrative example of system 100, any type of network device, network element or portion thereof and any type of associated resource, such as another communication resource or another queue, may be used in the illustrated example as one ordinarily skilled in the art will appreciate. In some embodiment, the queue pair 112 may be any type of queue or buffer used in communications related to the network 104. For example, FIGS. 1C and 1D depict embodiments of other environments for practicing the systematic queue pair numbering of the present invention.

Figure 1B:
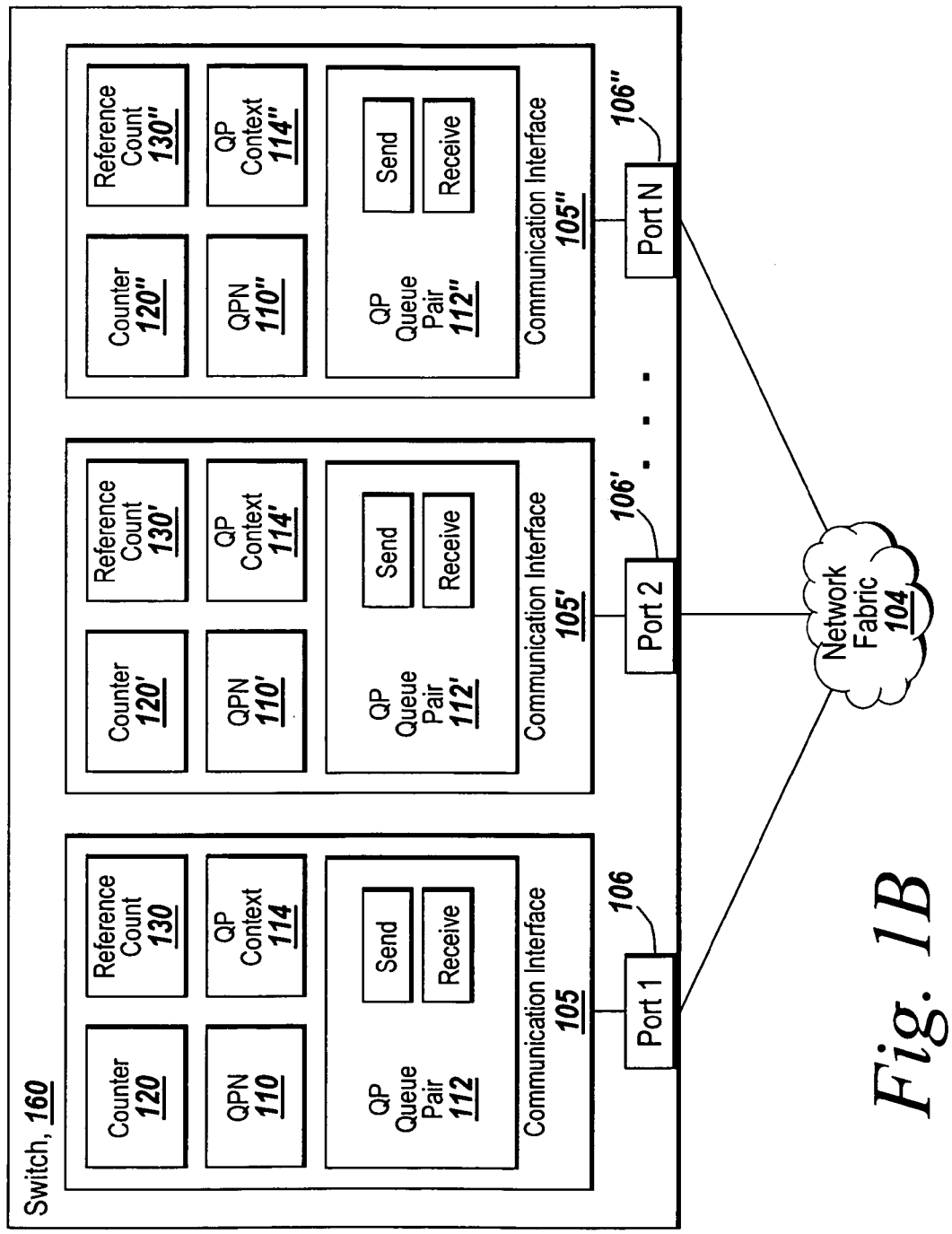
FIG. 1B is a block diagram of a network switch for practicing another illustrative embodiment of the present invention.
Figure 1C:
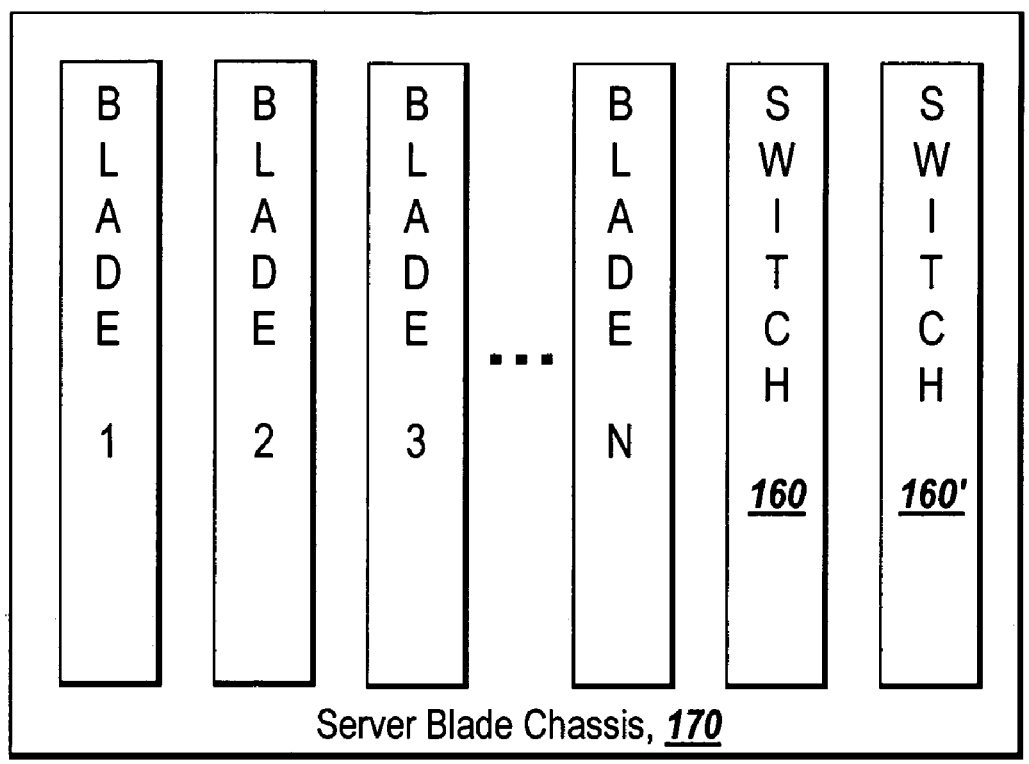
FIG. 1C is a block diagram of a blade system for practicing another illustrative embodiment of the present invention.

FIG. 1C depicts an illustrative example of a network switch 160, such as an IBA type switch or a blade type switch, connected by one or more ports 106-106" by any suitable means to a network fabric 104. Each of the multiple ports 106-106" of the switch 160 has a communication interface 105-105". Each communication interface 105-105" comprises a queue pair 112-112", queue pair context 114-114", and a queue pair number 110-110", as well as the counter 120-120" and the reference count 130-130" used for providing the queue pair numbering scheme of the present invention. Although shown with a communication interface 105-105" per port 106-106", in other embodiments of practicing the present invention, a communication interface 105 may be used or shared by multiple ports 106-106". One ordinarily skilled in the art will recognize and appreciate the various types of switches, routers, and similar network devices that may be used for practicing the operations of the present invention as described herein.

FIG. 1C depicts an illustrative example of a blade server chassis 170 comprising one or blade servers, also referred to as blades, and one or more switches 160, 160". The switches 160, 160' may comprise the structure of the switch 160 as shown in FIG. 1C and the function and operations of the queue pair numbering scheme as described herein but also be designed to run as a blade type switch in a blade server or blade switch system. As known by one ordinarily skilled in the art, a blade server, such as a blade of the illustrative example depicted in FIG. 1D, is a computer system on a motherboard, which includes one or more processor(s), memory, a network connection and sometimes storage. Typically, a blade server is designed as a thin, modular electronic circuit board that can be easily inserted into a space-saving rack, such as the blade server chassis 170 of FIG. 1D, with many similar blade servers sharing a common high speed bus. Blade servers are designed to create less heat and thus save energy costs as well as space. Blades can be added as required, often as "hot pluggable" units of computing. For example, blade server modules can be mounted vertically in multiple racks or rows of a single floor-standing cabinet. Additionally, blades can be rack mounted in multiple racks within a cabinet together with common cabling, redundant power supplies and cooling fans. One ordinarily skilled in the art will recognize and appreciate the various types of blade servers, blade systems, and blade server chassis 170 that may be used in practicing the operations of the present invention as described herein. Moreover, although described in an illustrative embodiment of an IBA system 100 and in examples of a channel adapter 102, a switch 160, and a blade switch in a blade server chassis 270, one ordinarily skilled in the art will also recognize any type of networking architecture, networking system and network device may be used in practicing the illustrative embodiment of the present invention.

Figure 1D:
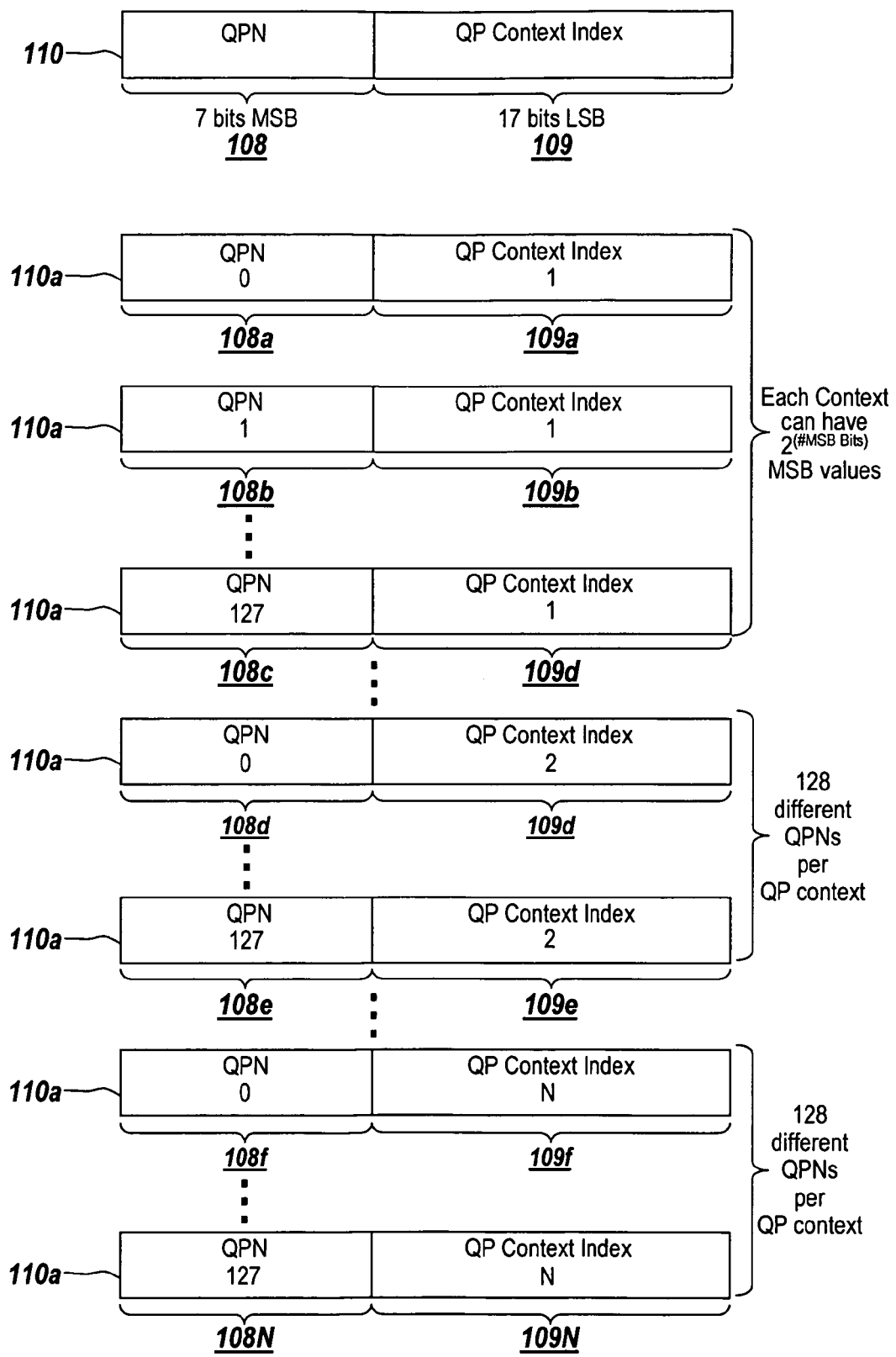
FIG. 1D is a block diagram of queue pair numbers in practicing an illustrative embodiment of the present invention.

FIG. 1D depicts details of an illustrative queue pair number 110 in practicing an illustrative embodiment of the present invention. In an exemplary embodiment, the queue pair number 110 (also referred to as "QPN"), comprises a 24 bit number. The 17 least significant bits ("LSB") 109 of the QPN 110 comprise an index to a queue pair context 114. The 7 most significant bits ("MSB") 108 comprise the changeable portion of the QPN 110 available for assigning a desired number. The LSB 109 may provide any suitable index, reference, identifier, or pointer to the queue pair context 114, such as a pointer to a hardware table holding the information associated with the queue pair 112. Although described as a 24 bit number with an LSB 109 of 17 bits and a MSB 108 of 7 bits, the QPN 110 may be any number of bits supported by the software and/or hardware implementation of the present invention. Furthermore, the LSB 109 and the MSB 108 of the QPN 110 may be partitioned to be of any suitable portion of the QPN 110, and the LSB 109 may be larger or smaller than the MSB 108. Additionally, the LSB 109 and the MSB 108 may only comprise a portion of the QPN 110 as there may be other bits used for other purposes.

Although the LSB 109 is generally described as associated with a queue pair context 114, the LSB 109 may be associated with any type of context, or be a pointer to any other suitable or desired information. In some embodiments, the MSB 108 comprises all the bits of the QPN 110 and the QPN 110 does not reference a queue pair context 114. For example, the queue pair context 114 may be tracked or associated with a QPN 110 in any other element of the communication interface 105 or the channel adapter 102.

The number of possible combinations for a QPN 110 for a specific queue pair context 114 is determined by the number of bits of the MSB 108. The LSB 109 which provides the index to a queue pair context 114 typically cannot be changed since it points to a location or storage of the queue pair context 114 fixed by the implementation, such as in a hardware table. In the case of the illustrated QPN 110 of FIG. 1B, the MSB 108 is 7 bits in length and therefore, the MSB 108 can be set to 27 possible values, or a range of 0-127. Therefore, for each queue pair context 114 there can be up to 128 different QPNs 110 available to assign to a queue pair 112 for a queue pair context 114.

As depicted in FIG. 1B, each queue pair context 114 can have up to 128 QPNs 110*a*-110*n*. For example, QPNs 110*a*-110*c* identify the same LSB of queue pair context index 1. Therefore, the LSB 109*a*-109*c* of QPNs 110*a*-110*c* are each associated with the same queue pair context 114. The MSB 108*a* of QPN 110*a* is set to the first value of 0, MSB 108*b* of QPN 110*b* is set to 1, and MSB 108*c* of QPN 110*c* is set to the maximum value of 127. Likewise, the queue pair context 114 referenced by the queue pair context index 2 of LSBs 109*d*-109*e* can have up to 128 QPNs as depicted by QPNs 110*d*-110*e*. For each queue pair context 114 up to the maximum number of queue pair contexts identified by LSB 109*f*-109*n*, i.e., queue pair context index N, there can be 128 different QPNs 110*f*-110*n* as set by the MSB 108*f*-108*n*. For example, in one embodiment, the IBA supports up to $2^{24}$ queue pairs 110 per channel adapter 102. One ordinarily skilled in the art will recognize the value range for setting the MSB 108 changes accordingly with the number of bits available for the MSB 108, and therefore, also, the number of different QPNs 110 for each queue pair context 114.

Figure 2A:
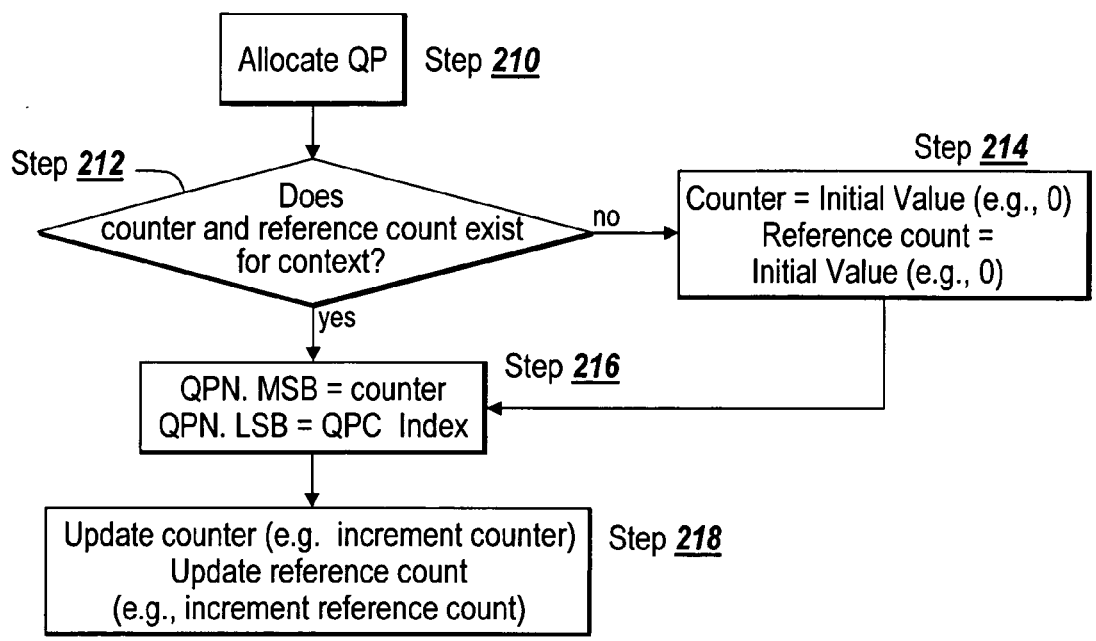
FIG. 2A is a flow diagram depicting steps performed in an illustrative method of a queue pair allocation operation of the present invention.
Figure 2B:
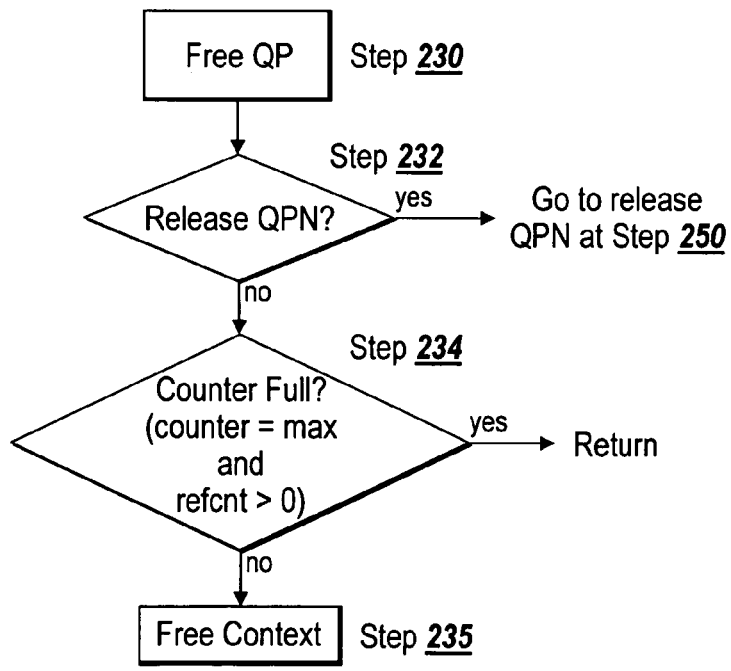
FIG. 2B is a flow diagram depicting steps performed in an illustrative method of a queue pair free operation of the present invention.
Figure 2C:
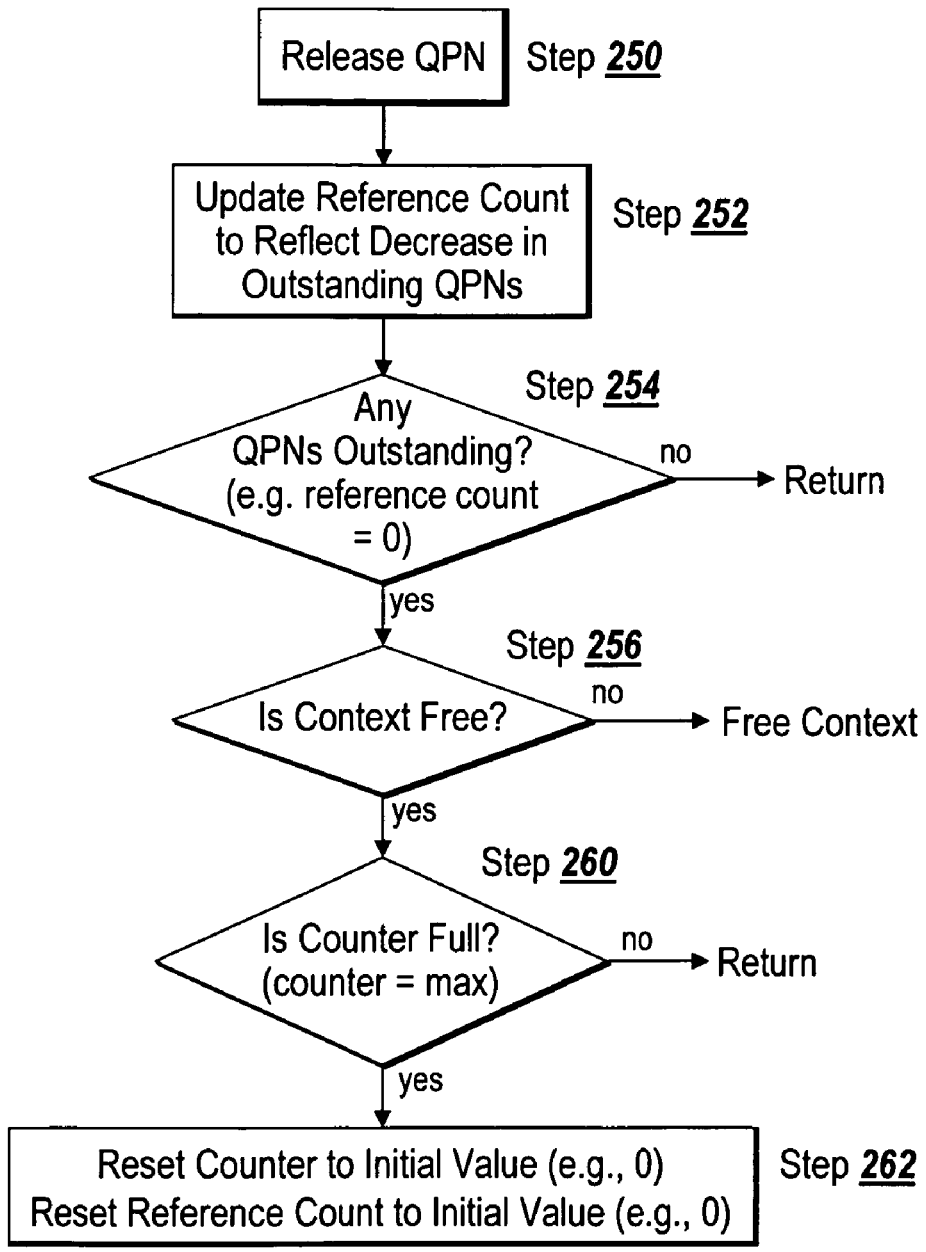
FIG. 2C a is a flow diagram depicting steps performed in an illustrative method of a queue pair number release operation of the present invention.

FIGS. 2A-2C depict an illustrative method of practicing the present invention in conjunction with the illustrative embodiment of FIGS. 1A and 1B. The illustrative method will be described in conjunction with queue pair operations such as a QP allocation operation, a QP free operation and a QPN release operation. One ordinarily skilled in the art will appreciate and recognize the various forms and types of queue pair operations that may be implemented in the IBA illustration. As will be further appreciated by one ordinarily skilled in the art, there can be any type and form of operations instruction or command to perform queue pair allocation and deallocation (free) and queue pair number assignment and release in performing the operations of the present invention as described below. In an exemplary embodiment, the queue pair and queue pair number related operations are performed in the communication interface 105, such as the tavor driver from Sun Microsystems, Inc.

FIG. 2A illustrates the step associated with allocating a queue pair 112 and providing a queue pair number 110 for the created queue pair 112 and associated with a queue pair context 114. At step 210 of the illustrative method, a QP allocation operation is performed to create a queue pair 112 and establish a virtual communication port in accordance with the illustrative example of the IBA system 100 of FIG. 1A. At step 212, the illustrative method checks if a counter 120 and reference count 130 exist for the queue pair context 114 associated with the queue pair 112. If a counter 120 and reference count 130 do not exist, a counter 120 and reference count 130 are created or otherwise established at step 214 for the queue pair context 114. The counter 120 and reference count 130 are set to an initial value. In an exemplary embodiment, the initial value for the counter 120 and reference count 130 is set to 0. However, other desired initial values may be used in practicing the present invention. In other embodiments, the initial value of the reference count 130 may be set to a value to indicate a QPN 110 has not yet been assigned, allocated or otherwise provided that references the queue pair context 114. For example, the reference count 130 may be set to a Boolean value, such as false, or to some other value besides a numerical count.

If the counter 120 and reference count 130 exist for the queue pair context 114, the illustrative method at step 216 sets the MSB 108 of the QPN 110 for the queue pair 112 to the value of the counter 120, and the LSB 109 of the QPN 110 to an index to the queue pair context 114. At step 215, the illustrative method updates the counter 120 to provide the next value for the MSB 108 of the QPN 110 to be used in a subsequent QP allocation operation. Also, at step 215, the reference count 130 is updated to indicate the use of a queue pair number 110 associated with the queue pair context 114 is outstanding. In an exemplary embodiment, the illustrative method at step 215 increments the counter 120 by 1 and the reference count 130 by 1. In other embodiments, the counter 120 may be set according to any algorithm or desired logic. For example, the counter 120 may be incremented by any increment steps, such as by 2, 5 or 10. In other embodiments, the counter 120 may use odd or even numbers. In alternative embodiments, instead of incrementing the reference count 130, the reference count 130 may be set to any value indicating the QPN 110 has been assigned, allocated or otherwise provided that references the queue pair context 114.

In incrementing the counter 120 in accordance with the steps of the illustrative method of FIG. 2A, the counter 120 contains the next value to be assigned to the MSB 108 of the QPN 110. In other embodiments, the counter 120 could be implemented to store the value last assigned to the MSB 108 of the QPN 110 and at step 216, the MSB 108 of the QPN 110 is set to the value of the counter incremented by 1 or any other step increment. In incrementing the reference count 130 in the exemplary embodiment of the illustrative method, the reference count 130 identifies the number of QPNs 110 pointing to a queue pair context 114, or otherwise allocated to a queue pair 112 associated with the queue pair context 114.

Referring now to FIG. 2B, the steps of the illustrative method of the present invention for managing the counter 120 and reference count 130 during a free QP operation are depicted. At step 230, a free queue pair 112 operation is initiated. The illustrative method at step 232 checks if the free QP operation also requests the release of the QPN 110 assigned to the queue pair 112 in addition to freeing the queue pair 112 and queue pair context 114. If the operation at step 230 does not request the QPN 110 to be released, the illustrative method at step 234 checks if the counter 120 has reached a maximum value. The maximum value for the counter 120 can be set to the maximum number the MSB 108 of the QPN 110 can be set in accordance with the number of bits of the MSB 108, such as the value 127 for a 7 bit MSB 108. In other embodiments, the maximum value for the counter 120 can be set to any desired amount between 0 and the maximum MSB 108 value. This maximum value of the counter 120 can be set statically and/or dynamically by any suitable means or mechanisms known by one ordinarily skilled in the art. For example, the communication interface 105 may provide a user or command interface to set the maximum counter value to be checked at step 234.

Additionally, at step 234, the illustrative method can also check if the reference count 130 indicates if any QPNs 110 for a queue pair context 114 is outstanding. In an exemplary embodiment, the illustrative method checks if the reference count 130 is greater than 0. Since the reference count 130 tracks the number of QPNs 110 allocated to a queue pair context 114 in the exemplary embodiment, the reference count 130 should be greater than 0 when a queue pair 112 remains allocated from a QP allocation operation. Accordingly in order to perform a QP free allocation on a queue pair 112, at least one QPN 110 should be outstanding.

If the counter 120 has not reached its maximum value, then at step 234, the queue pair 112 and the queue pair context 114 is freed in accordance with the free QP operation. Otherwise, if the counter 120 has reached its maximum value, the queue pair context 114 is not freed and the step returns from the free QP operation initiated at step 230. If the free QP operation includes a request to release the QPN 110, at step 232, then the illustrative method performs the steps in accordance with the illustrative embodiment of the release QPN operation depicted in FIG. 2C.

Referring now to FIG. 2C, steps of the illustrative method for handling the counter 120 and reference count 130 during a release QPN operation are depicted. At step 250, the release QPN operation is initiated and at step 252, the reference count 130 is updated to indicate that the QPN 110 is no longer outstanding with respect to the queue pair context 114. In an exemplary embodiment, the reference count 130 is decremented, and in one embodiment, the reference count 130 is decremented by 1. In other embodiments, the reference count 130 is decremented by the same steps as the reference count 130 was incremented. Alternatively, the number of references to the queue pair context 114 may be tracked separately, and if the number of references reaches 0 the reference count 130 is set to a value that indicates there are not any QPNs 110 outstanding, or not yet released, for the queue pair context 114.

At step 254 of the illustrative method of FIG. 2C, the reference count 130 is checked to determine if the reference count 130 indicates whether there are any QPNs 110 outstanding for the queue pair context 114. In an exemplary embodiment, if the reference count 130 is equal to 0, then there must be not be any QPNs 110 to release and step 254 returns from the release QPN operation. If the reference count 130 is greater than 0, the illustrative method checks if the queue pair context 114 is free at step 256. If the queue pair context 114 has not been freed, the queue pair context is freed at step 258.

In either case of step 258, the illustrative method then continues at step 260 to check whether the counter 120 has reached its maximum value. As previously described, the maximum value of the counter can be set to the maximum value of the MSB 108 or a desired maximum value. If the counter 120 has reached the maximum value, the illustrative method then returns from the QPN release operation without changing the counter 120. Otherwise, if the counter 120 has reached the maximum value, the counter 120 and the reference count 130 are set to their respective initial values, such as 0. Accordingly, the illustrative method will use all the desired combinations of MSB 108 settings for a QPN 110 until the maximum MSB 108 value is reached and there are no more outstanding QPN 110 references. After resetting the counter 120 and reference count 130, the present invention will start to re-use previously provided QPNs 110.

In other embodiments, the illustrative method of FIGS. 2A-2C can re-use QPNs 110 that have been released prior to the counter 120 being set to a value that would cause the QPN 110 to be re-used. This can occur when a QP free operation without releasing the QPN is performed one or more times. Although the queue pair 112 is freed, the QPNs 110 assigned to it still remain outstanding. Then as QP allocations are performed, the counter 120 is incremented and new QPNs 110 provided with MSB 108 values greater than the MSB 108 of the outstanding QPN 110. For example, a first QPN 110 with an MSB 108 of 1 is provided from a first QP allocation operation. The queue pair 112 is then freed without releasing the QPN 110. Then, two QP allocations and QP free without QPN release operations are performed for MSB 108 values of 2 and 3 respectively. This would cause the MSB 108 value of 4 (counter=4) to be the next value assigned. However, the QPN 110 with an MSB 108 value of 1 is still outstanding. Prior to the next QP allocation operation, a QPN release operation may be performed to release the QPN 110 with the MSB 108 value of 1. For the next QP allocation operation, the QPN 110 could be set to re-use the MSB 108 value of 1 before using the QPN 110 with an MSB 108 set to the current counter 120 value of 4.

One ordinarily skilled in the art will appreciate how the illustrative method of FIGS. 2A-2C could be adapted to track and manage the re-use of QPNs 110 prior to using all of the maximum available QPN combinations. Any suitable mechanism or means known by one ordinarily skilled in the art could be used to track the current release state and/or frequency of re-use for each QPN 110. For example, a data structure for each QPN 110 for each queue pair context 114 could be used with variables to track information about the QPN 110. This may also be implemented in a table of the hardware of the channel adapter 102. Furthermore, any QPN 110 re-use scheme could be applied in performing the operations of the present invention.

The operations of the present invention can be further understood in the context of illustrative examples as depicted by FIGS. 3A-3D. The respective tables 310, 315, 320 and 325 of FIGS. 3A-3D depict the values of the reference count 130 and the counter 120 after a series of queue pair operations performed in accordance with the steps of the illustrative method of FIGS. 2A-2C. Each of these examples start with initial values of 0 for the reference count 130 and counter 120.

In the first example, table 310 of FIG. 3A shows the results of a QP allocation followed by a QPN free without release operation, and then a QPN release operation. After performing the QP allocation operation in accordance with the steps of FIG. 2A, a queue pair 112 is allocated and the reference count 130 and the counter 120 are both set to 1. For example, the first QPN 110 assigned to a queue pair 112 has a MSB 108 of 0, the same value as the counter 120 prior to being incremented. Then, a QP free without releasing the QPN operation is performed in accordance with the illustrative method depicted in FIG. 2B. The allocated queue pair context 114 of the queue pair 112 is freed but the QPN 110 with an MSB 108 set to 1 remains outstanding. Accordingly, the reference count 130 remains set to 1, and the counter 120 remains set to the next MSB 108 value to be assigned of 1. Then a QPN release operation is performed in accordance with the illustrated method of FIG. 2C. Since the queue pair context 114 is already freed, the reference count 130 is decremented to 0. The counter 120 remains set to 1 for the next QP allocation operation.

In the second example illustrated by table 315 of FIG. 3B, a QP free with a QPN release operation is performed after the QP allocation operation. As in the previous example, the QP allocation operation allocates a queue pair 112 with a QPN 110 having an MSB 108 value set to 0. As a result of the operation, the reference count 130 and the counter 120 are both set to 1. Then a QP free with a QPN release operation is performed in accordance with the illustrative method of FIGS. 2B and 2C. The allocated queue pair context 114 of the queue pair 112 is freed and since the QPN 110 is also released in the same operation, the reference count 130 is decremented by 1. The counter 120 remains set at 1 representing the next MSB 108 value to be assigned for a subsequent QP allocation operation.

The illustrative example represented by table 320 of FIG. 3C shows the results of a series of queue pair operations, including multiple QP allocation and QPN release operations. A first QP allocation operation provides a QPN 110 with an MSB value of 1 and results in a reference count 130 and counter 120 set to 1. Next, a QP free allocation without a QPN release operation frees the queue pair context 114 but leaves the QPN 110 with an MSB 108 of 1 outstanding. This results in the reference count 130 and the counter 120 remaining set at 1. Then a series of QP allocation operations are performed twelve (12x) times. For each QP allocation operation, the reference count 130 and counter 120 are incremented by 1. As such, the MSB 108 of value of the QPN 110 for each operation was set to 1 through 12 respectively. In one embodiment of successive QP allocation operations, the queue pair context 114 remains allocated and the QPN 110 referencing the queue pair context 114 is updated in accordance with the illustrative method of FIG. 2A. After, the last of the twelve QP allocation operations, the counter 120 is set to 13 to represent the next MSB 108 value to be assigned. Since there were 13 QP allocation operations without any corresponding QPN release operations, the reference count 130 is set to 13 indicating that 13 QPNs 110 remain outstanding.

In continuing the illustrative example of table 320, a final QPN release operation is then performed to release a QPN 110 outstanding. The QPN release operation could have a parameter passed to it to indicate which QPN 110 to release. As such, the QPN release operation could release any of the QPNs 110 with an MSB value from 0 to 12. As a result, the reference count 130 is decremented by one. Following the first QPN release operation, a series of eleven (11x) successive QPN release operations are performed. Each time, the reference count 130 is decremented by 1 and after the eleventh QPN release operation, the reference count 130 has a value of 1 as shown in table 320. The QPN release operations do not impact the value of the counter 120 which remains set at 13.

At this point, the reference count 130 of 1 reflects there is a single QPN 110 outstanding that is associated with the allocated queue pair 112 and queue pair context 114 of the last performed QP allocation operation. As a final step in the illustrative example, the last remaining QPN 110 is released with a QPN release operation. Since the queue pair context 114 is not yet freed, the QPN release operation will free the queue pair context 114 in accordance with the illustrative method of FIG. 2C. Accordingly, the reference count 130 is decremented by 1 to a value of 0. The counter 120 remains set at 13 representing the next MSB 108 value to be assigned for the next QP allocation operation.

In the last example illustrated by table 325 of FIG. 3D, a series of QP operations are performed, including multiple QP allocation and QP free without release operations. A first QP allocation is performed, and a queue pair 112 having a QPN 110 with an MSB 108 set to the initial counter value of 0 is allocated and associated with a queue pair context 114. The reference count 130 and counter 120 are accordingly set to 1. Then, a QP free without a QPN release is performed. The queue pair context 114 of the queue pair 112 is freed but the QPN 110 with an MSB 108 of 0 remains outstanding. As a result, the reference count 130 and counter 120 remain at 1. A series of 127 QP allocation and QP free without QPN release operations are performed. Each QP allocation operation causes the reference count 130 and counter 120 to increment by 1 resulting in a reference count 130 and counter 120 both set to 128. As such, the last MSB 108 value to be assigned had a value of 127. Since QPN release operations were not performed, the reference count 130 was never decremented. At this point in this example, a queue pair 112 and queue pair context 114 is allocated with a QPN 110 having an MSB 108 value of 127. Furthermore, 127 QPNs 110 with MSB 108 values of 0 through 126 remain outstanding.

In continuing the example illustrated by table 325, a first QPN release operation is performed. Since the reference count 130 is greater than 0 and in accordance with the illustrative method of FIG. 3C, the queue pair context 114 is not freed. One of the outstanding QPNs 110 is released and thus, the reference count 130 is decremented by 1 to a value of 127. Then, the QPN release operation is performed 127 (127x) times in a row. For the first 126 of the 127 QPN release operations, a QPN 110 is released and the reference count 130 is decremented by 1. However, the queue pair context 114 is not freed. On the final of the 127 QPN release operations in this example, the queue pair context 114 is freed and the reference count 130 is set to 0. In accordance with the illustrative method of FIG. 2C, since the counter is at the maximum value of 128, the counter is reset to an initial value of 0. In this example, all the possible 128 QPNs 110 for a queue pair context 114 were used. On the next QP allocation operation, the next QPN 110 having an MSB value of 0 will be re-used for the first time.

In view of the structure, functions and operations of the systematic queue pair numbering scheme as described herein, the present invention provides for the efficient re-use of queue pair numbers. The present invention reduces the frequency of re-use of queue pair numbers while also being able to maximize the use of all the possible combinations of queue pair numbers. Additionally, the present invention provides a reliable and repeatable numbering mechanism. This will reduce and/or prevent problems associated with frequent re-use of queue pair numbers or using invalid, stale or otherwise inappropriate queue pair numbers. Furthermore, the systematic numbering scheme will also be useful for the trouble shooting and debugging of communication interface issues related to queue pairs.

Although the illustrative embodiment of the systematic numbering scheme of the present invention is described in a networking environment where numbers are assigned to a network resource and associated with a context, the present invention is applicable to any other system or environment where identifiers are assigned to any type of entity, item, object, or resource, with or without an associated context. The numbering scheme of the present invention can be used to more efficiently re-use assigned numbers, reduce the frequency of re-use, or have the frequency of re-use occur in a repeatable and predictable manner.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. In an electronic device, a method comprising the steps of:
   providing an identifier for a queue pair, the queue pair associated with a context, the identifier comprising a first portion and a second portion;
   setting the first portion of the identifier to a value, the value taken from a counter, the counter containing a value to be used for a first portion of an identifier associated with the context; and
   setting a value of a reference counter to indicate one or more identifiers are associated with the context.

2. The method of claim 1, comprising:
   detecting that a further identifier is provided, the further identifier associated with the context; and
   in response, incrementing the reference counter.

3. The method of claim 1, comprising:
   determining from the reference counter that an identifier is not associated with the context; and
   in response, setting the counter to an initial value.

4. The method of claim 3, wherein determining comprises:
   determining that the counter has reached a maximum value.

5. The method of claim 1, comprising:
   detecting that an identifier is no longer associated with the context; and
   in response, decrementing the reference counter.

6. The method of claim 5 comprising:
   prior to detecting, performing a freeing operation to release the identifier from association with the context.

7. The method of claim 1, comprising:
   detecting that the counter is less than a maximum value; and
   in response, assigning the identifier to the queue pair.

8. The method of claim 1, comprising:
   detecting that the counter reaches a maximum value;
   determining that the reference counter indicates that an identifier is not associated with the context; and
   re-using a current identifier for a second queue pair, the second queue pair associated with the context.

9. The method of claim 1, wherein the context comprises a queue pair context and the second portion of the identifier provides an index into a portion of a communication interface storing information associated with the queue pair.

10. The method of claim 1 comprising:
    incrementing the counter so that value contained in the counter may be used to set a first portion of a subsequently provided identifier.

11. The method of claim 10 comprising:
    performing a queue pair allocation operation; and
    in response, providing a subsequent identifier, wherein a first portion of the subsequent identifier is set to the value contained in the counter.

12. A network device comprising
    a queue pair used by the network device;
    a context having information associated with the queue pair;
    a mechanism for assigning an identifier to the queue pair associated with the context, the identifier comprising a first portion and a second portion;
    a counter containing a value to be used for setting a first portion of an identifier associated with the context; and
    a reference counter;
    wherein the mechanism:
    sets the first portion of the identifier to the value of the counter; and
    sets a value to the reference counter to indicate one or more identifiers are allocated to the context.

13. The network device of claim 12, wherein the mechanism detects that the counter is less than a maximum value and, in response, assigns the identifier to the queue pair.

14. The network device of claim 12, wherein the mechanism detecting that a further identifier is provided, the further identifier associated with the context, and in response, increments the reference counter.

15. The network device of claim 12, wherein the mechanism determines from the reference counter that an identifier is not associated with the context, and in response, sets the counter to an initial value.

16. The network device of claim 15, wherein the mechanism also determines that the counter has reached a maximum value and sets the counter to an initial value.

17. The network device of claim 12, wherein the mechanism detects that the counter reaches a maximum value, determines that the reference counter indicates that an identifier is not associated with the context, and re-uses the identifier for a second queue pair, the second queue pair associated with the context.

18. The network device of claim 12, wherein the mechanism detects that an identifier is no longer associated with the context, and in response, decrements the reference counter.

19. The network device of claim 12, wherein the context comprises a queue pair context and the second portion of the identifier provides an index into a portion of a communication interface storing information associated with the queue pair.

20. A computer program product, stored on computer readable medium comprising:
    computer program code for providing an identifier for a queue pair, the queue pair associated with a context, the identifier comprising a first portion and a second portion;
    computer program code for setting the first portion of the identifier to a value, the value taken from a counter, the counter containing a value to be used for a first portion of an identifier associated with the context; and
    computer program code for setting a value of a reference counter to indicate one or more identifiers are associated with the context.

* * * * *